(12) United States Patent
Blizzard et al.

(10) Patent No.: US 8,368,218 B2
(45) Date of Patent: Feb. 5, 2013

(54) ADHESIVE FLEXIBLE BARRIER FILM, METHOD OF FORMING SAME, AND ORGANIC ELECTRONIC DEVICE INCLUDING SAME

(75) Inventors: John Donald Blizzard, Bay City, MI (US); William Kenneth Weidner, Bay City, MI (US)

(73) Assignee: Dow Corning Corporation, Midland, MI (US)

( * ) Notice: Subject to any disclaimer, the term of this patent is extended or adjusted under 35 U.S.C. 154(b) by 12 days.

(21) Appl. No.: 13/144,395

(22) PCT Filed: Jan. 13, 2010

(86) PCT No.: PCT/US2010/020933
§ 371 (c)(1),
(2), (4) Date: Jul. 13, 2011

(87) PCT Pub. No.: WO2010/083242
PCT Pub. Date: Jul. 22, 2010

(65) Prior Publication Data
US 2011/0272827 A1    Nov. 10, 2011

Related U.S. Application Data
(60) Provisional application No. 61/144,528, filed on Jan. 14, 2009.

(51) Int. Cl.
*H01L 23/48* (2006.01)
(52) U.S. Cl. ... 257/751; 257/750; 257/783; 257/E23.16; 257/E21.584; 438/627; 438/643; 438/653
(58) Field of Classification Search ............... 257/751, 257/753, 783, E23.16, E21.584, E21.514, 257/750; 438/214, 411.1, 423.7, 475, 480, 438/627, 643, 653
See application file for complete search history.

(56) References Cited

U.S. PATENT DOCUMENTS
| | | | |
|---|---|---|---|
| 4,764,579 A * | 8/1988 | Wallace | 528/87 |
| 5,648,173 A | 7/1997 | Blizzard | |
| 5,840,428 A | 11/1998 | Blizzard et al. | |
| 6,120,860 A * | 9/2000 | Bowen et al. | 428/34.2 |

(Continued)

FOREIGN PATENT DOCUMENTS
| | | |
|---|---|---|
| EP | 1045009 A1 | 10/2000 |
| GB | 2367556 A | 4/2002 |

(Continued)

OTHER PUBLICATIONS
English language abstract for JP 07018221 extracted from Database WPI Week 199513 Thomson Scientific, London, GB; AN 1995-094032, 16 pages.

(Continued)

*Primary Examiner* — Jasmine Clark
(74) *Attorney, Agent, or Firm* — Howard & Howard Attorneys PLLC (57) ABSTRACT

An adhesive flexible barrier film comprises a substrate and a barrier layer disposed on the substrate. The barrier layer is formed from a barrier composition comprising an organosilicon compound. The adhesive flexible barrier film also comprises an adhesive layer disposed on the barrier layer and formed from an adhesive composition. A method of forming the adhesive flexible barrier film comprises the steps of disposing the barrier composition on the substrate to form the barrier layer, disposing the adhesive composition on the barrier layer to form the adhesive layer, and curing the barrier layer and the adhesive layer. The adhesive flexible barrier film may be utilized in organic electronic devices.

26 Claims, 4 Drawing Sheets

U.S. PATENT DOCUMENTS

| | | | |
|---|---|---|---|
| 6,896,979 | B2 | 5/2005 | Sawai et al. |
| 7,074,501 | B2 * | 7/2006 | Czeremuszkin et al. ..... 428/690 |
| 7,857,930 | B2 * | 12/2010 | Bybee et al. .................. 156/182 |
| 2007/0224368 | A1 | 9/2007 | Hara et al. |
| 2008/0305350 | A1 | 12/2008 | Agata |

FOREIGN PATENT DOCUMENTS

| | | |
|---|---|---|
| JP | 07018221 | 1/1995 |
| WO | WO 2010083236 A1 | 7/2010 |

OTHER PUBLICATIONS

International Search Report for Application No. PCT/US2010/020923 dated May 4, 2010, 4 pages.

International Search Report for Application No. PCT/US2010/020933 dated Jun. 1, 2010, 4 pages.

* cited by examiner

ADHESIVE FLEXIBLE BARRIER FILM, METHOD OF FORMING SAME, AND ORGANIC ELECTRONIC DEVICE INCLUDING SAME

RELATED APPLICATIONS

This application claims priority to and all the advantages of International Patent Application No. PCT/US2010/020933, filed on Jan. 13, 2010, which claims priority to U.S. Provisional Patent Application No. 61/144,528, filed on Jan. 14, 2009.

STATEMENT OF GOVERNMENT RIGHTS

This invention was made with government support under Contract No. DE-FC26-05NT42344 awarded by the Department of Energy. The government has certain rights in the invention.

FIELD OF THE INVENTION

The present invention generally relates to an adhesive flexible barrier film and a method of forming the adhesive flexible barrier film. The adhesive flexible barrier film has excellent water vapor transmission rates and flexibility. The present invention also relates to an organic electronic device including the adhesive flexible barrier film.

DESCRIPTION OF THE RELATED ART

Adhesives are known in the art and are utilized in many different industries and diverse applications. Typically, adhesives are disposed between two substrates such that the substrates are "bonded" together. Examples of traditional adhesives include pressure sensitive adhesives, ultraviolet light curable adhesives, thermoplastic adhesives, and reactive adhesives. One example of an industry which utilizes adhesives is the organic electronic device industry. Examples of organic electronic devices include organic light emitting diodes (OLEDs), organic electrochromic displays, organic photovoltaic devices, and organic thin film transistors.

Organic electronic devices are susceptible to degradation and/or failure due to exposure to moisture and/or oxygen. Typical organic electronic devices include an organic material disposed between two substrates and sealed between the two substrates via an adhesive, such as an ultraviolet-cured epoxy resin adhesive, which is disposed about the perimeter of the organic material. The two substrates are generally metal or glass, which are hermetic and act as a barrier to prevent moisture and/or oxygen from degrading the organic electronic devices. However, the ultraviolet-cured epoxy resin adhesive is generally non-hermetic, and moisture and/or oxygen may permeate the ultraviolet-cured epoxy resin adhesive over time and deteriorate the organic material of the organic electronic device. In addition, each of these substrates has significant drawbacks. For example, metal is opaque and both glass and metal are rigid, i.e., inflexible. Further, the ultraviolet-cured epoxy resin adhesive is rigid, i.e., inflexible.

In addition, the organic material of the organic electronic device is generally disposed between a cathodic material and an anodic material. Therefore, each of the substrates must also be adhered to one of the cathodic material and the anodic material. The cathodic material and the anodic material are typically different, and may be selected from, for example, indium tin oxide, calcium, copper, etc. Because of the variety of materials utilized in the organic electronic device, the adhesive utilized must have excellent adhesion to the variety of materials and surface energies thereof.

Because it is becoming more advantageous for organic electronic devices to have flexibility, one attempt to improve organic electronic devices is to encapsulate the organic material of the organic electronic device with a thin film, i.e., a flexible barrier film. The organic material encapsulated by the flexible barrier film is adhered via the adhesive to a flexible substrate. The flexible barrier film is advantageous over glass and metal because the flexible barrier film is both transparent and flexible. Flexibility is becoming an increasingly desirable physical property of organic electronic devices, such as OLEDs. For example, OLEDs which can be rolled and/or bent while still displaying an image are currently being developed. However, the flexibility of the organic electronic is limited by the adhesive. For example, the ultraviolet-cured epoxy resin adhesive has a poor flexibility, and often cracks or otherwise breaks when flexed. Further, the ultraviolet-cured epoxy resin adhesive has poor adhesion to the flexible barrier film.

In addition, degradation of the organic electronic device occurs as water vapor and/or oxygen permeate a side ingress of the organic electronic device. The side ingress is the organic electronic device is located between the two substrates, or between the flexible substrate and the flexible barrier film, and is where the adhesive is located. This permeation is typically quantified by a high water vapor transmission rate of the adhesive, which is a measure of a rate at which water passes through the adhesive as a function of the temperature and the humidity gradient across the adhesive as well as a thickness of the adhesive. Although the ultraviolet-cured epoxy resin adhesive has acceptable water vapor transmission rates, the ultraviolet-cured epoxy resin adhesive has the poor flexibility and adhesion to the flexible barrier film, as set forth above. Other adhesives which are flexible generally have the high water vapor transmission rate, which is undesirable.

One attempt to ameliorate the deficiencies of current adhesives for organic electronic devices is to utilize pressure sensitive adhesives, which do not require curing and/or activation to for adhesion. However, although pressure sensitive adhesives have excellent flexibility, the pressure sensitive adhesives have the high water vapor transmission rate, which is undesirable.

Other adhesives require heat curing for adhesion. However, if the adhesives which require heat curing are utilized in the organic electronic device, the organic material of the organic electronic device degrades during the application of heat to the adhesive.

In view the foregoing, it would be advantageous to provide an improved adhesive addressing the deficiencies set forth above. It would be further advantageous to provide an organic electronic device including the improved adhesive.

SUMMARY OF THE INVENTION AND ADVANTAGES

The present invention provides an adhesive flexible barrier film. The adhesive flexible barrier film comprises a substrate and a barrier layer disposed on the substrate. The barrier layer if formed from a barrier composition comprising an organosilicon compound having the general chemical formula $$M_xSi(OR)_y$$

wherein each OR is an independently selected alkoxy group having from 1 to 4 carbon atoms; each M is independently selected from a hydrogen atom, a monovalent hydrocarbon group, an amine group, a phenyl group, an acryloxy group, a methacryloxy group, and an epoxy group; x is 1, 2, or 3; y is 1, 2, or 3; and x+y=4. The adhesive flexible barrier further comprises an adhesive layer disposed on the barrier layer. The adhesive layer is formed from an adhesive composition comprising a multi-functional acrylate and an initiating agent.

The present invention also provides a method of producing the adhesive flexible barrier film. The method of producing the adhesive flexible barrier film comprises the step of providing the substrate. The method of producing the adhesive flexible barrier film further comprises the step of disposing the barrier composition on the substrate to form the barrier layer on the substrate. The method of producing the adhesive flexible barrier film also comprises the step of disposing the adhesive composition on the barrier layer to form the adhesive layer on the barrier layer. In addition, the method of producing the adhesive flexible barrier film comprises the step of curing the barrier layer and the adhesive layer to form the adhesive flexible barrier film.

The present invention also provides an organic electronic device. The organic electronic device comprises the support layer and an organic electronic material disposed on the support layer. The organic electronic device further comprises the adhesive flexible barrier film disposed on the organic electronic material such that the organic electronic material is encapsulated by the support layer and the adhesive flexible barrier film.

The adhesive flexible barrier film of the present invention has excellent adhesion to a variety of materials and surface energies. The adhesive flexible barrier film also has excellent water vapor transmission rates yet has excellent flexibility. The organic electronic device, which includes the adhesive flexible barrier film, has excellent longevity and resistance to degradation due to the excellent water vapor transmission rates of the adhesive flexible barrier film.

BRIEF DESCRIPTION OF THE DRAWINGS

Other advantages of the present invention will be readily appreciated, as the same becomes better understood by reference to the following detailed description when considered in connection with the accompanying drawing wherein.

DETAILED DESCRIPTION OF THE INVENTION

Referring to the Figures, wherein like numerals indicate corresponding parts throughout the several views, an adhesive flexible barrier film 10 is generally shown. The present invention provides the adhesive flexible barrier film 10 and a method of forming the adhesive flexible barrier film 10. The adhesive flexible barrier film 10 of the present invention has excellent water vapor transmission rates, adhesion to a variety of materials and surface energies, and flexibility. The present invention further provides an organic electronic device 22 including the adhesive flexible barrier film 10. The organic electronic device 22 may be any organic electronic device which includes the adhesive flexible barrier film 10 of the present invention. For example, the organic electronic device 22 may be an organic light emitting diode device, an organic electrochromic display device, an organic photovoltaic device, and/or an organic thin film transistor device. However, it is to be appreciated that the adhesive flexible barrier film 10 of the present invention may be used in applications other than organic electronic devices. For example, the adhesive flexible barrier film 10 of the present invention may be utilized in adhesive applications due to the excellent adhesion of the adhesive flexible barrier film 10.

The adhesive flexible barrier film 10 comprises a substrate 12. In certain embodiments of the present invention, the substrate 12 is a polymeric substrate. In many applications utilizing the adhesive flexible barrier film 10 of the present invention, such as the organic electronic device 22, it is desirable that the adhesive flexible barrier film 10 and the substrate 12 are flexible. Therefore, the substrate 12 typically has a thickness of from greater than zero to 20, more typically from 1 to 10, most typically from 4 to 8, mils. Examples of the polymeric substrate suitable for the purposes of the present invention include, but are not limited to, polyesters, polyethersulphones, polyimides, fluorocarbons, and combinations thereof. A particular example of a polyester suitable for the purposes of the present invention is polyethylene terephthalate, which is commercially available from many different suppliers. A particular example of a fluorocarbon suitable for the purposes of the present invention is ethylene-tetrafluoroethylene, which is commercially available from DuPont Polymers, Specialty Polymer Division, of Wilmington, Del.

The adhesive flexible barrier film 10 further comprises a barrier layer 14 disposed on the substrate 12. The barrier layer 14 of the adhesive flexible barrier film 10 typically has a thickness of from 0.001 to 625, more typically from 0.1 to 375, most typically from 25 to 250, µm. The barrier layer 14 of the adhesive flexible barrier film 10 is formed from a barrier composition. The barrier composition comprises an organosilicon compound having the general chemical formula:

wherein each OR is an independently selected alkoxy group having from 1 to 4 carbon atoms; each M is independently selected from a hydrogen atom, a monovalent hydrocarbon group, an amine group, a phenyl group, an acryloxy group, a methacryloxy group, and an epoxy group; x is 1, 2, or 3; y is 1, 2, or 3; and x+y=4. In other words, the organosilicon compound of the barrier composition has at least one alkoxy group and at least one functional group selected from the group of a hydrogen atom, a monovalent hydrocarbon group, an amine group, a phenyl group, an acryloxy group, a methacryloxy group, and an epoxy group. As set forth by the formula "x+y=4," the organosilicon compound may comprise one alkoxy group and three functional groups independently selected from the functional groups set forth above, two independently selected alkoxy groups and two functional groups selected from the functional groups set forth above, or three independently selected alkoxy groups and one of the functional groups set forth above. Specific examples of the organosilicon compound suitable for the purposes of the present invention include, but are not limited to, phenyltrimethoxysilane, methacryloxypropyltrimethoxysilane, and methyltrimethoxysilane, each commercially available from Dow Corning Corp. of Midland, Mich. Typically, the barrier composition is free from multi-functional acrylates and/or initiating agents.

In certain embodiments of the present invention, the organosilicon compound of the barrier composition is an aminosilane. Aminosilanes suitable for the purposes of the present invention have the general chemical formula:

$$M^1_x Si(OR)_y$$

wherein each $M^1$ is independently selected and comprises at least one amine group; x is 1, 2, or 3; y is 1, 2, or 3; and x+y=4. In other words, the aminosilane has at least one alkoxy group and at least one group which comprises at least one amine group. As set forth by the formula "x+y=4," the aminosilane may comprise one alkoxy group and three groups which comprise at least one amine group, two independently selected alkoxy groups and two groups which comprise at least one amine group, or three independently selected alkoxy groups and one group which comprises at least one amine group. It is to be appreciated that $M^1$ comprises one or more amine groups. For example, when $M^1$ comprises more than one amine group, $M^1$ may comprise a secondary amine which is bonded to a primary amine and to the silicon atom via divalent hydrocarbon groups. For illustrative purposes only, Formula I below depicts such an aminosilane:

(Formula 1)

wherein each R is an independently selected monovalent hydrocarbon group and each $R^1$ is an independently selected divalent hydrocarbon group. A specific example of an aminosilane having more than one amine group and suitable for the purposes of the present invention is aminoethylaminopropyltrimethoxysilane, commercially available from Dow Corning Corp. of Midland, Mich.

Figure 1:
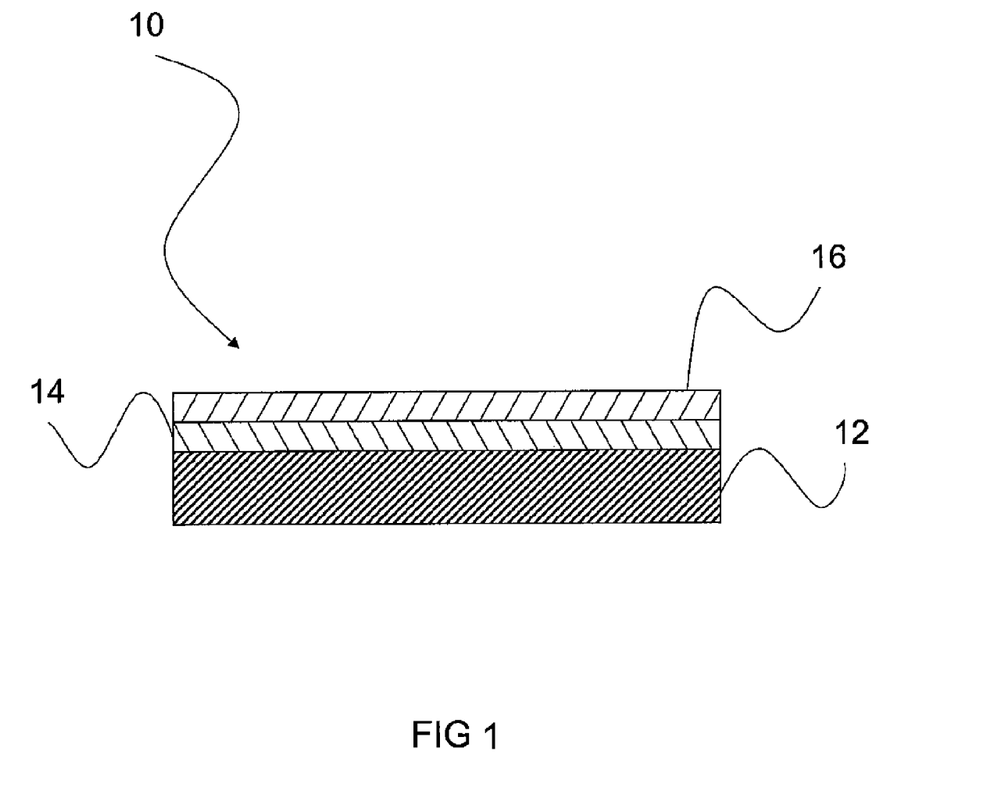
FIG. 1 is a cross-sectional view of an adhesive flexible barrier film comprising a substrate, a barrier layer disposed on the substrate, and an adhesive layer disposed on the barrier layer.

The adhesive flexible barrier film 10 further comprises an adhesive layer 16 disposed on the barrier layer 14. FIG. 1 generally illustrates the adhesive layer 16 disposed on the barrier layer 14, which is disposed on the substrate 12. The adhesive layer 16 of the adhesive flexible barrier film 10 typically has a thickness of from 0.001 to 625, more typically from 0.1 to 375, most typically from 25 to 250, μm. The adhesive layer 16 is formed from an adhesive composition. The adhesive composition comprises a multi-functional acrylate and an initiating agent. Typically, the adhesive composition is free from organosilicon compounds, such as those present in the barrier composition described above.

The multi-functional acrylate of the adhesive composition is typically selected from the group of aliphatic urethane acrylates, aromatic urethane acrylates, epoxy-functional acrylates, isobutylene acrylates, and combinations thereof. In certain embodiments, the multi-functional acrylate is the aliphatic urethane acrylate, such as aliphatic urethane diacrylate. When the multi-functional acrylate is the aliphatic urethane acrylate, the multi-functional acrylate is typically what is referred to in the art as a "pre-polymer." Pre-polymers are typically oligomers which are formed by reacting two or more components such that the pre-polymers have excess functional groups which remain unreacted in the pre-polymers. It is to be appreciated that the multi-functional acrylate may be a monomer or may be a polymer. In addition, the multi-functional acrylate may comprise a blend of different types of multi-functional acrylates. The blend of multi-functional acrylates may comprise any combination of multi-functional acrylates which are monomeric, oligomeric, and/or polymeric. When the multi-functional acrylate is the aliphatic urethane acrylate, the aliphatic urethane acrylate is typically formed by reacting an isocyanate and a polyol such that the aliphatic urethane acrylate formed therefrom has at least two functional groups selected from acryloxy functional groups, methacryloxy functional groups, and combinations thereof. At least one of the isocyanate and the polyol has at least one acryloxy functional group and/or methacryloxy functional group, which remains in the aliphatic urethane acrylate formed from reacting the isocyanate and the polyol. As designated by the term "aliphatic," the aliphatic urethane acrylate is free from aromatic groups. An example of a multi-functional acrylate suitable for the purposes of the present invention is Ebecryl® 230, commercially available from Cytec Industries, Inc. of West Paterson, N.J. Another example of a multi-functional acrylate suitable for the purposes of the present invention is pentaerythritol tetraacrylate.

As set forth above, the adhesive composition further comprises an initiating agent. The initiating agent may be any initiating agent known in the art. In certain embodiments, the initiating agent comprises a photoinitiating agent. Photoinitiating agents are known in the art and undergo a photoreaction upon the absorption of light, which is typically in the ultraviolet spectrum, i.e., from 300 to 400 nm. The photoreaction generally forms reactive species, which may initiate or catalyze further chemical reactions. Typically, the photoreaction initiates a polymerization or polycondensation reaction. Therefore, when the adhesive composition of the present invention includes the photoinitiating agent, the adhesive flexible barrier film 10 may be cured by applying ultraviolet radiation to the adhesive layer 16 formed therefrom, as described in greater detail below.

When cured, the barrier layer 14 and the adhesive layer 16 typically have a combined thickness of from 1 to 5000, more typically from 1 to 1000, most typically from 1 to 500, nm. At this thickness, the adhesive flexible barrier film 10 of the present invention has excellent water vapor transmission rates, when cured. The water vapor transmission rate is a measure of a rate at which water passes through the adhesive flexible barrier film 10 as a function of the temperature and the humidity gradient across the adhesive flexible barrier film 10. The adhesive flexible barrier film 10 has the excellent water vapor transmission rates even when the adhesive flexible barrier film 10 has a thickness of less than 500 nm. This is particularly advantageous when the adhesive flexible barrier film 10 of the present invention is included in the organic electronic device 22, because water vapor and/or oxygen can degrade the organic electronic device 22 if the water vapor and/or oxygen permeates the adhesive flexible barrier film 10. The adhesive flexible barrier film 10 of the present invention typically has a water vapor transmission rate of no more than $1 \times 10^{-3}$, more typically no more than $5 \times 10^{-4}$, most typically no more than $1 \times 10^{-4}$ μg/m²/day at 22° C. and 47% relative humidity, as measured according to the calcium degradation test, which is described below.

Typically, to measure water vapor transmission rates, ASTM E-398 is utilized. However, when the adhesive flexible barrier film 10 is utilized in the organic electronic device 22, the water vapor and/or oxygen typically permeate the organic electronic device 22 at a side ingress of the organic electronic device 22. Therefore, to properly measure the water vapor transmission rate for the side ingress, the calcium degradation test was designed and is commonly used in the industry. To determine the water vapor transmission rate via the calcium degradation test, calcium is first deposited on a first glass substrate via thermal evaporation. Typically, the calcium is deposited to a thickness of about 100 nm in a generally circular pattern having a diameter of about 1 inch. Then, the barrier composition and the adhesive composition are separately disposed on the first glass substrate about the circumference of the calcium to form the barrier layer 14 and the adhesive layer 16, respectively. A second glass substrate is then placed over the barrier layer 14, the adhesive layer 16, and the calcium, and the barrier layer 14 and the adhesive layer 16 are cured, which effectively "seals" the calcium between the first and second glass substrates to form a test structure. The test structure is then placed in a temperature and humidity controlled oven, which operates at 22° C. and 47% relative humidity. As the calcium oxidizes, calcium oxide and hydrogen gas are formed. The calcium becomes transparent as the calcium oxidizes, and the transparency is measured via a Gardner Haze Meter, and the transparency is converted to the water vapor transmission rate.

In certain embodiments, the adhesive flexible barrier film 10 further comprises an impeding layer 18 formed from an impeding composition and disposed between the substrate and the barrier layer 14. The impeding layer 18, which may be referred to as a "flexible barrier film," is utilized to impart the adhesive flexible barrier film 10 with a more desirable water vapor transmission rate and typically has a thickness of from greater than zero to 500 nm. One example of an impeding composition suitable for forming the impeding layer 18 of the present invention is disclosed in co-pending U.S. patent application Ser. No. 13/144,362, which is entitled "Flexible barrier film, method of forming same, and organic electronic device including same" and was filed on even day herewith.

Figure 2:
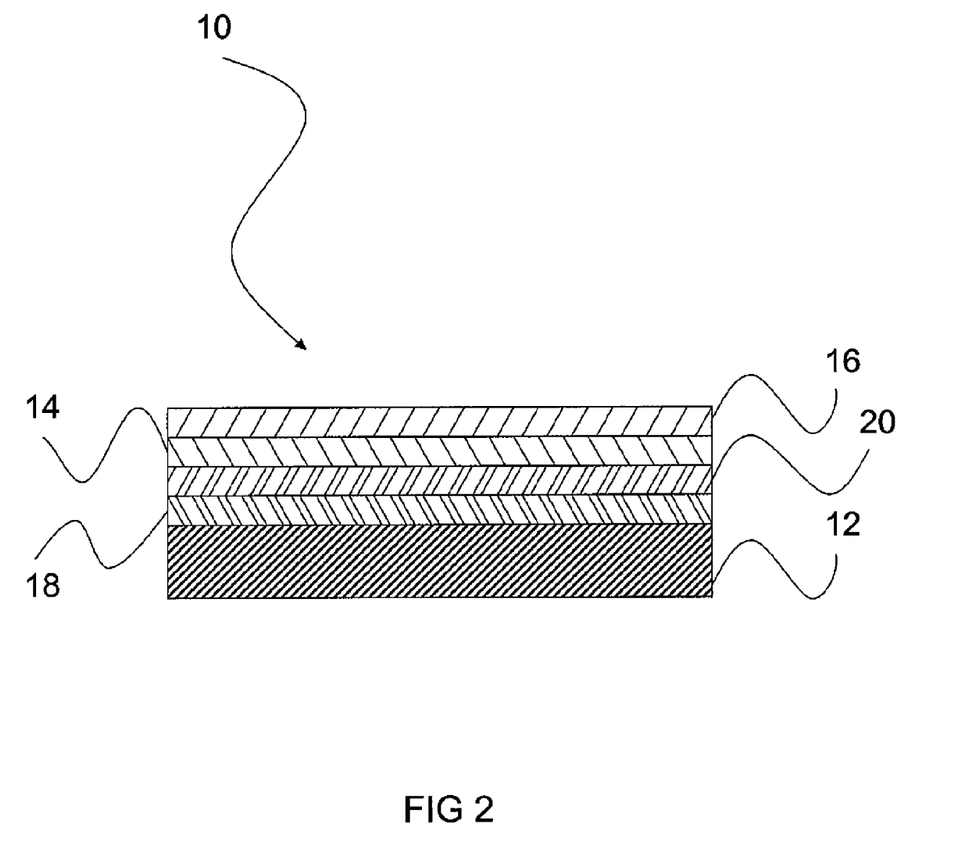
FIG. 2 is a cross-sectional view of another adhesive flexible barrier film including an impeding layer disposed on the substrate, an inorganic layer disposed on the impeding layer, the barrier layer disposed on the inorganic layer, and the adhesive layer disposed on the barrier layer.

In certain embodiments, the adhesive flexible barrier film 10 further comprises an inorganic layer 20 formed from an inorganic composition. The inorganic layer 20 may be disposed between the substrate 12 and the barrier layer 14. When the adhesive flexible barrier film 10 includes the impeding layer 18 set forth above, the inorganic layer 20 is typically disposed between the impeding layer 18 and the barrier layer 14. In this embodiment, the impeding layer 18 is disposed on the substrate 12, the inorganic layer 20 is disposed on the impeding layer 18, the barrier layer 14 is disposed on the inorganic layer 20, and the adhesive layer 16 is disposed on the barrier layer 14, as illustrated in FIG. 2. Typically, the inorganic composition comprises a metal oxide, a metal carbide, a metal nitride, or combinations thereof. For example, the inorganic composition may be silicon-based, such as SiO, SiC, SiN, SiOC, SiON, and/or SiOCN. Another example of the inorganic composition includes, but is not limited to, $Al_2O_3$. It is to be appreciated that although the inorganic composition may comprise a carbon-containing compound, these compositions are still generally referred to as inorganic compositions in the art. Generally, the inorganic layer 20 may also be referred to as a ceramic layer in the art. When utilized, the inorganic layer 20 typically has a thickness of from greater than zero to 5,000, more typically from 1 to 1,000, most typically from 50 to 500, nanometers.

In embodiments in which the organosilicon compound of the barrier composition comprises the aminosilane, the alkoxy groups of the aminosilane hydrolyze such that the amine groups are perpendicular to the substrate 12, i.e., the amine groups are generally pointed away from the substrate 12. When the adhesive flexible barrier film 10 comprises the inorganic layer 20, the aminosilane of the barrier composition bonds to the inorganic layer 20 as the aminosilane is hydrolyzed to cure the barrier layer.

It is to be appreciated that the barrier composition, the adhesive composition, or both, may further comprise other components and/or compounds not specifically recited herein. For example, the barrier composition, the adhesive composition, or both, may further comprise group I or group II metals, silica, aluminosilicates, and the like for scavenging water vapor and increasing the water vapor transmission value of the adhesive flexible barrier film 10. In addition, the barrier composition, the adhesive composition, or both, may further comprise dyes and/or fillers to enhance and/or modify physical properties of the barrier layer 14 and/or the adhesive layer 16 of the adhesive flexible barrier film 10.

When cured, the adhesive flexible barrier film 10 of the present invention has excellent adhesion to a variety of materials and surface energies. For example, the adhesive flexible barrier film 10 of the present invention typically has an adhesion value of at least 200, more typically at least 2,000, most typically at least 4,000, KPa, as measured according to the Romulus 111 Universal Tester by QUAD Group. The Romulus 111 Universal Tester utilizes what is known in the art as the "stud pull test." In this test, an aluminum pull stud having a diameter of 0.28 inches is adhered to a piece of soda lime glass via the barrier layer 14 and the adhesive layer 16 of the adhesive flexible barrier film 10 of the present invention. Once the barrier layer 14 and the adhesive layer 16 are cured, the force required to pull the aluminum pull stud perpendicularly from the soda lime glass is calculated and is referred to as the "adhesion value" of the barrier layer 14 and the adhesive layer 16 of the adhesive flexible barrier film 10.

In addition to the excellent adhesion, the adhesive flexible barrier film 10 of the present invention has excellent flexibility when cured, which is particularly desirable when the adhesive flexible barrier film 10 is utilized in the organic electronic device 22, as described in greater detail below. Flexibility of the adhesive flexible barrier film 10 can be measured by nanoindentation, which is a technique known in the art to determine hardness of a material. The nanoindentation measures mechanical properties of the adhesive flexible barrier film 10, such as Young's modulus, which is a ratio of stress to strain of a material. The lower the Young's modulus, the greater the flexibility of the adhesive flexible barrier film 10. The adhesive flexible barrier film 10 of the present invention typically has a Young's modulus of no more than 2,000, more typically no more than 1,000, most typically no more than 500, MPa.

As set forth above, the present invention also provides a method of forming the adhesive flexible barrier film 10. The method comprises the step of providing the substrate 12, which is described above. The substrate 12 may be provided in any manner; for example, the method of forming the adhesive flexible barrier film 10 may be a continuous process such that the substrate 12 is continuously provided or the method of forming the adhesive flexible barrier film 10 may be a batch process.

The method further comprises the step of disposing the barrier composition on the substrate 12 to form the barrier layer 14 on the substrate 12. The step of disposing the barrier composition on the substrate 12 is typically selected from the group of spin coating, flow coating, gravure coating, slot die coating, meyer rod coating, vapor deposition, plasma enhanced chemical vapor deposition, chemical vapor deposition, sputter coating, evaporation, and combinations thereof. Typically, the step of disposing the barrier composition on the substrate 12 comprises gravure coating, flow coating, or slot coating, which allows for the organosilicon compound of the barrier layer 14 to hydrolyze to cure the barrier layer 14.

When the adhesive flexible barrier film 10 further comprises the impeding layer 18, the method further comprises the step of disposing the impeding composition on the substrate 12 to form the impeding layer 18 on the substrate 12. In this embodiment, the barrier composition is disposed on the impeding layer 18 to form the barrier layer 14 on the impeding layer 18. The impeding composition may be disposed on the substrate 12 in any manner. For example, the impeding composition may be disposed on the substrate 12 by chemical deposition, plasma enhanced deposition, and the like. Alternatively, the impeding composition may be disposed on the substrate 12 by spin coating, printing, snowing, spray coating, and the like. In addition, the impeding composition may be disposed on the substrate via a roll application, such as a gravure roll application.

When the adhesive flexible barrier film 10 comprises the inorganic layer 20, the method further comprises the step of disposing the inorganic composition on the substrate 12 to form the inorganic layer 20 on the substrate 12. When the adhesive flexible barrier film 10 also comprises the impeding layer 18, the inorganic composition is disposed on the impeding layer 18 to form the inorganic layer 20 on the impeding layer 18. In this embodiment, the barrier composition is disposed on the inorganic layer 20 to form the barrier layer 14 on the inorganic layer 20. The inorganic composition may be disposed on the substrate 12, or the impeding layer 18, in any manner. For example, the inorganic composition may be disposed on the substrate 12, or the impeding layer 18, by physical chemical vapor deposition, chemical vapor deposition, plasma physical vapor deposition, evaporation, and the like. Alternatively, the inorganic composition may be disposed on the substrate 12 by spin coating, printing, snowing, spray coating, and the like.

The method further comprises the step of disposing the adhesive composition on the barrier layer 14 to form the adhesive layer 16 on the barrier layer 14. The step of disposing the adhesive composition may include, but is not limited to, spin coating, flow coating, gravure coating, slot die coating, meyer rod coating, and vapor deposition. Typically, the step of disposing the adhesive composition comprises gravure coating at a line speed of 10 m/min.

The method also includes the step of curing the barrier layer 14 and the adhesive layer 16 to produce the adhesive flexible barrier film 10. In certain embodiments, when the adhesive composition comprises the photoinitiating agent, the step of curing the adhesive layer 16 comprises applying ultraviolet radiation to the adhesive layer 16. Curing the adhesive layer 16 by applying ultraviolet radiation to the adhesive layer 16 is particularly advantageous when the adhesive flexible barrier film 10 is utilized in the organic electronic device 22. For example, applying ultraviolet radiation to the adhesive layer 16 does not require heat, which is commonly utilized to cure compositions and/or layers. Heat can have adverse effects on the organic electronic device 22, such as thermal degradation, and such adverse effects do not exist when the step of curing the adhesive layer 16 comprises applying ultraviolet radiation to the adhesive layer 16. The step of curing the barrier layer 14 typically comprises hydrolyzing the organosilicon compound of the barrier layer 14. The barrier layer 14 is typically hydrolyzed for 120 minutes at 23° C. and 50% relative humidity to cure the barrier layer 14.

As described in greater detail below, when the adhesive flexible barrier film 10 is utilized in the organic electronic device 22, the adhesive layer 16 is typically cured to produce the adhesive flexible barrier film 10 after the substrate 12, the barrier layer 14, and the adhesive layer 16 are applied on the organic electronic device 22. When the substrate 12, including the barrier layer 14 and the adhesive layer 16, is applied on the organic electronic device 22, the substrate 12 is the outermost layer. Therefore, when the step of curing the adhesive layer 16 comprises applying ultraviolet radiation to the adhesive layer 16, the ultraviolet radiation must be able to at least partially penetrate at least one layer of the organic electronic device 22 to cure the adhesive layer 16. Because at least one layer of the organic electronic device 22 is generally opaque, as described in greater detail below, the ultraviolet radiation typically penetrates through the substrate 12 and cures the adhesive layer 16. However, when the substrate 12 comprises polyethylene terephthalate, the substrate 12 typically does not allow ultraviolet radiation having a wavelength less than 320 nm to penetrate through the substrate 12. Further, only about 50% of the ultraviolet radiation having a wavelength greater than 400 nm penetrates the substrate 12. As such, when the substrate 12 comprises polyethylene terephthalate, the step of curing the adhesive layer 16 typically comprises applying ultraviolet radiation having a wavelength of from 320 to 440, more typically from 330 to 420, most typically from 340 to 400, nm to the adhesive layer 16. The ultraviolet radiation typically has an energy of from 500 to 8,000, more typically from 1,000 to 4,000, most typically from 1,000 to 2,000 mJ/cm$^2$. The ultraviolet radiation is typically applied to the adhesive layer 16 for a time of from 0.1 to 40, more typically from 0.1 to 20, most typically from 0.25 to 5, seconds.

As set forth above, the present invention also provides an organic electronic device 22. The organic electronic device 22 may be any organic electronic device 22 which includes the adhesive flexible barrier film 10 of the present invention. For example, the organic electronic device 22 may be the organic light emitting diode device, the organic electrochromic display device, the organic photovoltaic device, and/or the organic thin film transistor device.

The organic electronic device 22 comprises a support layer 26. The support layer 26 may comprise any material and may be transparent, translucent, or opaque. In certain embodiments, the support layer 26 comprises a metal, such as stainless steel foil. In other embodiments, the support layer 26 comprises glass. Alternatively, the support layer 26 may comprise a polymeric material, such as polyethylene terephthalate, polyethersulfone, and/or polyethylene naphthalate. When the support layer 26 comprises the polymeric material, the support layer 26 may further comprise the impeding layer 18 disposed thereon. In other words, the support layer 26 may be the same as or different from the substrate 12, and may also be the same as the substrate 12 having the impeding layer 18 disposed thereon. Because the adhesive flexible barrier film 10 of the present invention has excellent flexibility, it is advantageous when the support layer 26 is flexible as well. When the support layer 26 is flexible, the entire organic electronic device 22 is flexible without having adverse effects on the organic electronic device 22, such as breaking and/or cracking.

The organic electronic device 22 also comprises an organic electronic material 24 disposed on the support layer 26. The organic electronic material 24 is typically selected based on the type of organic electronic device 22. For example, when the organic electronic device 22 is the electrochromic device, the organic electronic material 24 typically comprises an electrochromic material. Typically, the organic electronic material 24 comprises a polymeric material. In addition, the organic electronic material 24 typically further comprises a cathode and an anode, and the polymeric material is disposed between the cathode and the anode. Typically, the anode comprises indium tin oxide, which is substantially transparent. This is desirable because when the anode is transparent, a person can view the polymer of the organic electronic material 24, which typically displays a color and/or an image. The cathode typically comprises a metal film, such as a calcium film and/or an aluminum film. It is to be appreciated that depending on the type of organic electronic device 22, more layers may be present in the organic electronic material 24. For example, organic light emitting diode devices typically include an emissive layer and a conductive layer between the cathode and the anode. The type of organic electronic material 24 is not crucial for the purposes of the present invention.

Figure 3:
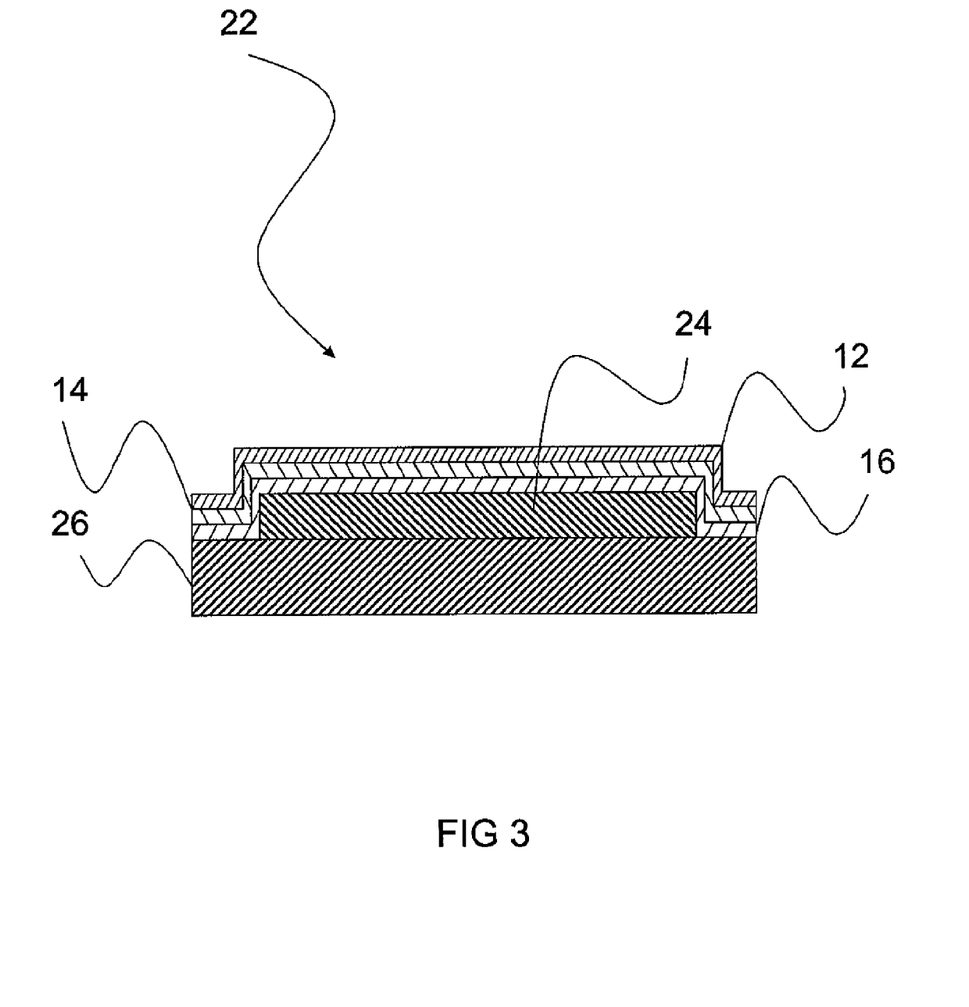
FIG. 3 is a cross-sectional view of an organic electronic device including a support layer, an organic electronic material disposed on the support layer, and the adhesive flexible barrier film of FIG. 1 disposed on the organic electronic material.
Figure 4:
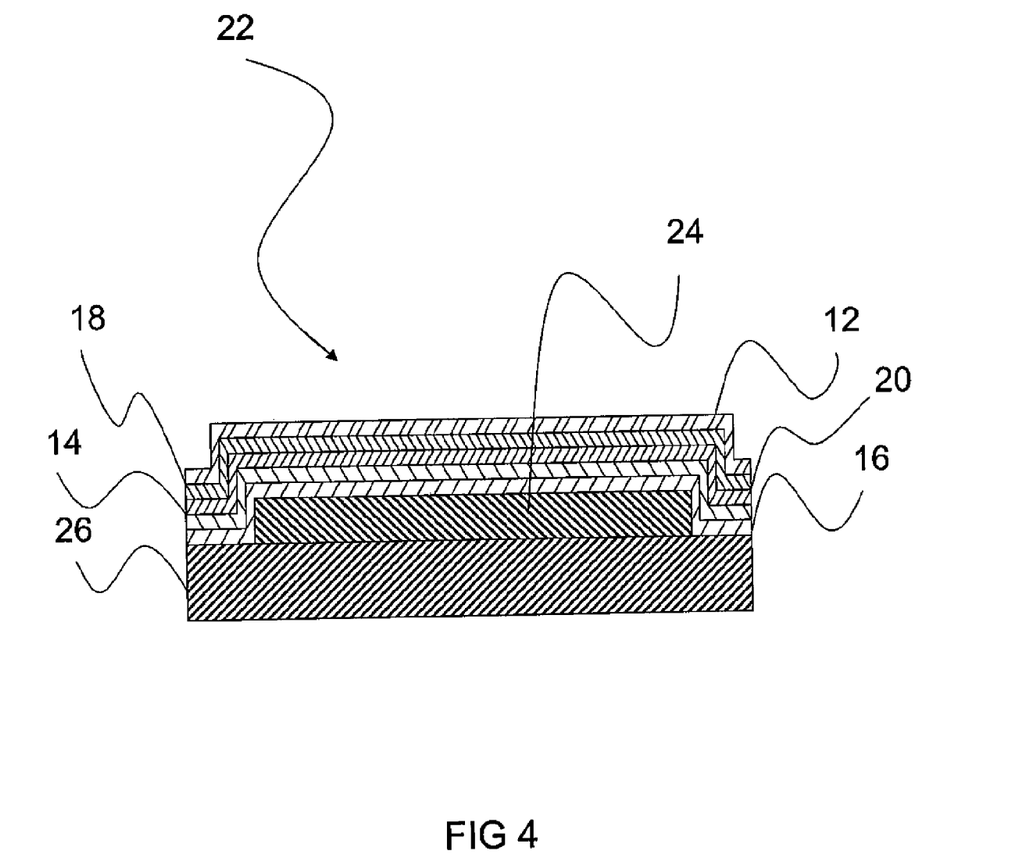
FIG. 4 is a cross-sectional view of another organic electronic device including the support layer, the organic electronic material disposed on the support layer, and the adhesive flexible barrier film of FIG. 2 disposed on the organic electronic material.

The organic electronic device 22 further comprises the adhesive flexible barrier film 10. The adhesive flexible barrier film 10 is disposed on the organic electronic material 24 such that the organic electronic material 24 is encapsulated between the support layer 26 and the adhesive flexible barrier film 10. The adhesive flexible barrier film 10 is disposed on the organic electronic material 24 such that the adhesive layer 16 of the adhesive flexible barrier film 10 is disposed on the organic electronic material 24. In other words, the substrate 12 is typically the outermost layer of the organic electronic device 22. FIG. 3 generally illustrates the organic electronic device 22 including the support layer 26, the organic electronic material 24 disposed on the support layer 26, and the adhesive flexible barrier film 10 disposed on the organic electronic material 24. As set forth above, the adhesive flexible barrier film 10 may include the impeding layer 18 and/or the inorganic layer 20. FIG. 4 generally illustrates the organic electronic device 22 in which the adhesive flexible barrier film 10 includes the impeding layer 18 and the inorganic layer 20.

The organic electronic device 22 has excellent longevity and resistance to degradation due to the excellent water vapor transmission rates of the adhesive flexible barrier film 10. For example, the organic electronic device 22 typically has a useful life which exceeds 5,000 hours.

The following examples, illustrating the adhesive flexible barrier film 10 and the method of producing the adhesive flexible barrier film 10 of the present invention, are intended to illustrate and not to limit the invention.

EXAMPLES

An adhesive composition comprises a multi-functional acrylate and an initiating agent. The amount and type of each component used to form each respective adhesive composition is indicated in Table 1 below with all values in percent by weight based on the total weight of the combined components prior to reaction to make each respective adhesive composition unless otherwise indicated.

TABLE 1

|  | Example 1 | Example 2 | Example 3 |
|---|---|---|---|
| Multi-functional acrylate 1 | 95 | — | — |
| Multi-functional acrylate 2 | — | 95 | — |
| Multi-functional acrylate 3 | — | — | 95 |
| Initiating agent 1 | 4 | 4 | 4 |
| Initiating agent 2 | 1 | 1 | 1 |

Multi-functional acrylate 1 is an amine modified epoxy acrylate, commercially available from Sartomer Co. of Exton, Pa.

Multi-functional acrylate 2 is a polybutadiene diacrylate, commercially available from Sartomer Co. of Exton, Pa.

Multi-functional acrylate 3 is an aliphatic urethane acrylate, commercially available from Sartomer Co. of Exton, Pa.

Initiating agent 1 is 2-hydroxy-2-methyl-1-phenyl-propan-1-one, commercially available from Ciba Specialty Chemicals Corp. of Tarrytown, N.Y.

Initiating agent 2 is bis(2,4,6-trimethylbenzoyl)-phenylphosphineoxide, commercially available from Ciba Specialty Chemicals Corp. of Tarrytown, N.Y.

Adhesion of an adhesive layer formed from each respective adhesive composition is determined via stud pull test. In the stud pull test, aluminum studs are adhered to glass substrates and the force required to pull the aluminum studs perpendicularly from the glass substrates is calculated. The glass substrates utilized are soda lime glass substrates, each having a length of 2 inches, a width of 3 inches, and a thickness of 2 mm. The soda lime glass substrates are commercially available from the Howard Glass Co., of Worcester Mass. The soda lime glass substrates are cleaned with a detergent solution and dried via a spin rinse dryer. Each side of the soda lime substrates are treated with ultraviolet radiation for one minute via an ultraviolet ozone cleaning system. The aluminum studs utilized each include a head having a diameter of 0.28 inches, and are commercially available from Quad Group, Inc., of Spokane, Wash. Each of the heads is cleaned with isopropyl alcohol. The aluminum studs are disposed in a spring loaded jig. 4 µL of the adhesive composition is disposed on each of the heads via a 5 mL Norm-Ject Luer Lock disposable syringe, commercially available from Henke Sass Wolf, of Dudley, Mass. The disposable syringe is capped with a 0.016 inch tapered syringe tip commercially available from EFD, Inc., of East Providence, R.I. The disposable syringe is disposed in a syringe pump, commercially available from New Era Pump Systems Inc., of Wantagh, N.Y. Each of the aluminum studs is retracted and the soda lime glass substrates are placed in the spring loaded jig, and the aluminum studs are released to come into contact with the soda lime glass substrates. The spring loaded jig is disposed in an ultraviolet chamber, and the adhesive layer is cured. The adhesive value for each of the Examples is calculated via a Quad Group Romulus 111 Universal Tester. Table 2 below indicates the adhesive value for each of the Examples.

TABLE 2

|  | Example 1 | Example 2 | Example 3 | Control |
|---|---|---|---|---|
| Adhesive value (KPa) | 578 | 203 | 6350 | 6270 |
| Failure mode | adhesive | cohesive | cohesive | adhesive |

The control adhesive is an ultraviolet radiation curable epoxy adhesive containing 100% solids and free from solvents, commercially available from Electro-lite Corporation of Bethel, Conn.

Adhesive and cohesive failure was determined visually by determining whether the failure occurred at the interface between the adhesive layer and the head of the aluminum stud, i.e., the substrate, or internally within the adhesive layer. Adhesive failure is a failure at the interface between the adhesive layer and the substrate, while cohesive failure is failure within the adhesive layer itself.

Comparative Example 1

Table 3 below indicates the adhesive value of the adhesive layer formed from the adhesive composition of Example 3 when a barrier composition is disposed on a soda lime glass substrate to form a barrier layer on the soda lime glass substrate prior to disposing the adhesive composition on the barrier layer. The barrier composition is deposited on the soda lime glass substrate via spin coating, and the barrier composition is hydrolyzed for 120 minutes at 23° C. and 50% relative humidity to form the barrier layer. The barrier composition comprises an aminoethylaminopropyltrimethoxysilane, commercially available from Dow Corning Corp. of Midland, Mich. The adhesive composition of Example 3 is then disposed on the head of an aluminum stud as described above, and the adhesion value is determined via the stud pull test which is also described above.

TABLE 3

|  | Example 3 |
| --- | --- |
| Adhesive value (KPa) | 8690 |
| Failure mode | coheisve |

Therefore, as illustrated by the comparative example 1, adhesion is significantly improved when the barrier composition is disposed on the substrate to form the barrier layer and the adhesive composition is disposed on the barrier layer to form the adhesive layer.

Comparative Example 2

Table 4 below further illustrates advantageous of utilizing the barrier layer and the adhesive layer. In Comparative Example 2, each of the Examples 4-7 comprises a single composition comprising a multi-functional acrylate, an initiating agent, and an organosilicon compound. Each of the compositions is deposited on a head of an aluminum stud and the adhesion values for each layer formed from each of the compositions was determined via the stud pull test described above.

TABLE 4

|  | Example 4 | Example 5 | Example 6 | Example 7 |
| --- | --- | --- | --- | --- |
| Multi-functional acrylate 1 | — | — | — | — |
| Multi-functional acrylate 2 | — | — | — | — |
| Multi-functional acrylate 3 | 99.5 | 99 | 98.5 | 96.6 |
| Initiating agent 3 | 0.5 | 0.5 | 0.5 | 0.5 |
| Organosilicon compound | — | 0.5 | 1 | 2.9 |
| Adhesive value (KPa) | 6350 | 1810 | 2200 | 3230 |
| Failure mode | cohesive | adhesive | cohesive | cohesive |

Initiating agent 3 is bis acyl phosphine and α-hydroxyketone, commercially available from Ciba Specialty Chemicals Corp. of Tarrytown, N.Y.

Organosilicon compound is aminoethylaminopropyltrimethoxysilane, commercially available from Dow Corning Corp. of Midland, Mich.

As evidenced in Table 4, the adhesion of the adhesive flexible barrier film is undesirable when the multi-functional acrylate, the initiating agent, and the organosilicon compound are all utilized in a single composition to form the adhesive layer. The adhesive value for the adhesive flexible barrier film which utilized separate and distinct barrier layers and adhesive layers, as illustrated in Table 3, is excellent in view of these adhesive values for the adhesive layers formed from the single composition for each of Examples 4-7 in Table 4.

Flexibility of the barrier layer and the adhesive layer of an adhesive flexible barrier film is determined via nanoindentation. Nanoindentation measures mechanical properties of the barrier layer and/or the adhesive layer, including Young's modulus, which is indicative of flexibility. In nanoindentation, a pointed tip is pressed into the adhesive flexible barrier film to a predetermined depth. The pointed tip is connected to an instrument which measures the load applied as the pointed tip is pressed into the adhesive flexible barrier film, as well as data from retracting the pointed tip from the adhesive flexible barrier film. The Young's modulus and hardness of the adhesive flexible barrier film is then calculated via the Oliver and Pharr method, which is known in the art. Table 5 below indicates the Young's modulus and hardness of a control, a hard coat, and a layer formed from Example 3 above. The control is the same control adhesive as described above in Table 2. The hard coat is an impeding layer which is disclosed in co-pending U.S. patent application Ser. No. 13/144,362, which is entitled "Flexible barrier film, method of forming same, and organic electronic device including same" and is/was filed on even day herewith.

TABLE 5

|  | Example 3 | Control | Hard coat |
| --- | --- | --- | --- |
| Young's modulus | 194.05 MPa | 3.54 GPa | 4.67 GPa |
| Hardness | 6.04 MPa | 0.25 GPa | 0.36 GPa |

To determine a water vapor transmission rate via a calcium degradation test, calcium is first deposited on a first glass substrate via thermal evaporation. The calcium is deposited to a thickness of about 100 nm in a generally circular pattern having a diameter of about 1 inch. Then, the barrier composition is disposed on the first glass substrate about the circumference of the calcium to form the barrier layer. The adhesive composition is disposed on the barrier layer to form the adhesive layer. A second glass substrate is then placed over the barrier layer and the adhesive layer to form a test structure. The barrier layer and the adhesive layer are cured via ultraviolet radiation to form an adhesive flexible barrier film. This test structure is placed in a temperature and humidity controlled oven, which operates at 38° C. and 80% relative humidity. As the calcium oxidizes, calcium oxide and hydrogen gas are formed. The calcium becomes transparent as the calcium oxidizes, and the transparency is measured via a Gardner Haze Meter, and the transparency is converted to the water vapor transmission rate. Table 6 below shows the water vapor transmission rates for various adhesive flexible barrier films.

TABLE 6

|  | Example 1 | Example 2 | Example 3 | Hard Coat | Control |
| --- | --- | --- | --- | --- | --- |
| Multi-functional acrylate 1 | 95 | — | — | — | — |
| Multi-functional acrylate 2 | — | 95 | — | — | — |
| Multi-functional acrylate 3 | — | — | 95 | — | — |
| Initiating agent 1 | 4 | 4 | 4 | — | — |
| Initiating agent 2 | 1 | 1 | 1 | — | — |
| Control adhesive | — | — | — | — | 100 |
| Hard coat | — | — | — | 100 | — |
| Water vapor transmission rate (g/m$^2$/day) | $2.73 \times 10^{-4}$ | $1.23 \times 10^{-3}$ | $8.31 \times 10^{-5}$ | $9.97 \times 10^{-5}$ | $2.15 \times 10^{-5}$ |

As evidenced in Table 6, each of the Examples 1-3 of the adhesive composition forms adhesive layers having excellent water vapor transmission rates. These water vapor transmission rates are comparable to both the hard coat and control layers, though the adhesive layers formed from the adhesive compositions of Examples 1-3 exhibit improved properties with respect to Young's modulus, hardness, and the adhesive value over those of the hard coat and control layers.

The present invention has been described herein in an illustrative manner, and it is to be understood that the terminology which has been used is intended to be in the nature of words of description rather than of limitation. Obviously, many modifications and variations of the present invention are possible in light of the above teachings. The invention can be practiced otherwise than as specifically described within the scope of the appended claims.

The invention claimed is:

1. An adhesive flexible barrier film comprising:
   (A) a substrate;
   (B) a barrier layer disposed on said substrate and formed from a barrier composition, which comprises;
      an organosilicon compound having the general chemical formula $M_xSi(OR)_y$ wherein each OR is an independently selected alkoxy group having from 1 to 4 carbon atoms; each M is independently selected from a hydrogen atom, a monovalent hydrocarbon group, an amine group, a phenyl group, an acryloxy group, a methacryloxy group, and an epoxy group; x is 1, 2, or 3; y is 1, 2, or 3; and x+y=4, and
   (C) an adhesive layer disposed on said barrier layer and formed from an adhesive composition comprising;
      a multi-functional acrylate, and
      an initiating agent.

2. An adhesive flexible barrier film as set forth in claim 1 wherein said barrier layer and said adhesive layer have a combined thickness of from 1 to 5,000 nm.

3. An adhesive flexible barrier film as set forth in claim 1 wherein said barrier layer and said adhesive layer have a combined thickness of from 1 to 500 nm.

4. An adhesive flexible barrier film as set forth in claim 1 wherein said adhesive flexible barrier film has a water vapor transmission rate of no more than $1 \times 10^{-3}$ g/m$^2$/day at 22° C. and 47% relative humidity.

5. An adhesive flexible barrier film as set forth in claim 1 wherein said adhesive flexible barrier film has a water vapor transmission rate of no more than $1 \times 10^{-4}$ g/m$^2$/day at 22° C. and 47% relative humidity.

6. An adhesive flexible barrier film as set forth in claim 1 wherein said organosilicon of said barrier composition compound is selected from the group of aminosilanes having the general chemical formula $M^1_xSi(OR)_y$ wherein each $M^1$ is independently selected and comprises at least one amine group; x is 1, 2, or 3; y is 1, 2, or 3; and x+y=4.

7. An adhesive flexible barrier film as set forth in claim 1 wherein said multi-functional acrylate of said adhesive composition is selected from the group of aliphatic urethane acrylates, aromatic urethane acrylates, epoxy-functional acrylates, isobutylene acrylates, and combinations thereof.

8. An adhesive flexible barrier film as set forth in claim 1 further comprising an impeding layer formed from an impeding composition and disposed between said substrate and said barrier layer.

9. An adhesive flexible barrier film as set forth in claim 8 further comprising an inorganic layer formed from an inorganic composition and disposed between said impeding layer and said barrier layer.

10. An adhesive flexible barrier film as set forth in claim 1 further comprising an inorganic layer formed from an inorganic composition and disposed between said substrate and said barrier layer.

11. An adhesive flexible barrier film as set forth in claim 1 wherein said initiating agent of said adhesive composition is further defined as a photoinitiating agent.

12. An adhesive flexible barrier film as set forth in claim 1 wherein said substrate is further defined as a polymeric substrate selected from the group of polyesters, polyethersulphones, polyimides, fluorocarbons, and combinations thereof.

13. A method of producing the adhesive flexible barrier film according to claim 1, said method comprising the steps of:
   providing the substrate;
   disposing the barrier composition on the substrate to form the barrier layer on the substrate;
   disposing the adhesive composition on the barrier layer to form the adhesive layer on the barrier layer; and
   curing the barrier layer and the adhesive layer to produce the adhesive flexible barrier film.

14. A method as set forth in claim 13 further comprising the step of disposing an impeding composition on the substrate to form an impeding layer disposed between the substrate and the barrier layer.

15. A method as set forth in claim 14 further comprising the step of disposing an inorganic composition on the impeding layer to form an inorganic layer disposed between the impeding layer and the barrier layer.

16. A method as set forth in claim 13 further comprising the step of disposing an inorganic composition on the substrate to form an inorganic layer disposed between the substrate and the barrier layer.

17. A method as set forth in claim 13 wherein the step of disposing the barrier composition on the substrate is selected from the group of plasma enhanced chemical vapor deposition, chemical vapor deposition, sputter coating, evaporation, and combinations thereof.

18. A method as set forth in claim 13 wherein the step of disposing the adhesive composition on the barrier layer is selected from the group of spin coating, flow coating, gravure coating, slot die coating, meyer rod coating, vapor deposition, plasma enhanced chemical vapor deposition, chemical vapor deposition, sputter coating, and evaporation.

19. A method as set forth in claim 13 wherein the step of curing the adhesive layer comprises applying ultraviolet radiation to the adhesive layer.

20. A method as set forth in claim 13 wherein the step of curing the barrier layer comprises hydrolyzing the organosilicon compound of the barrier layer.

21. An organic electronic device, comprising:
   a support layer;
   an organic electronic material disposed on said support layer; and
   an adhesive flexible barrier film according to claim 1 disposed on said organic electronic material such that said organic electronic material is encapsulated by said support layer and said adhesive flexible barrier film;

wherein said adhesive flexible barrier film is disposed on said organic electronic material such that said adhesive layer of said adhesive flexible barrier film is disposed on said organic electronic material.

22. An organic electronic device as set forth in claim 21 wherein said adhesive flexible barrier film has an adhesion to said support layer of at least 2,000 KPa.

23. An organic electronic device as set forth in claim 21 wherein said adhesive flexible barrier film further comprises an impeding layer formed from an impeding composition and disposed between said substrate and said barrier layer.

24. An organic electronic device as set forth in claim 23 wherein said adhesive flexible barrier film further comprises an inorganic layer formed from an inorganic composition and disposed between said impeding layer and said barrier layer.

25. An organic electronic device as set forth claim 21 wherein said adhesive flexible barrier film further comprises an inorganic layer formed from an inorganic composition and disposed between said substrate and said barrier layer.

26. An organic electronic device as set forth in claim 21 wherein said substrate of said adhesive flexible barrier film is further defined as a polymeric substrate selected from the group of polyesters, polyethersulphones, polyimides, fluorocarbons, and combinations thereof.

* * * * *